United States Patent

Oh et al.

[11] Patent Number: 5,835,644
[45] Date of Patent: Nov. 10, 1998

[54] TE-PASS OPTICAL WAVEGUIDE POLARIZER USING ELECRO-OPTIC POLYMERS

[75] Inventors: Min-Cheol Oh; Wol-Yon Hwang; Jang-Joo Kim, all of Daejeon, Rep. of Korea

[73] Assignee: Electronics and Telecommunications Research Institute, Daejeon, Rep. of Korea

[21] Appl. No.: 845,715

[22] Filed: Apr. 25, 1997

[30] Foreign Application Priority Data

Dec. 4, 1996 [KR] Rep. of Korea ............ 96-61703

[51] Int. Cl.[6] .................................................. G02B 6/00
[52] U.S. Cl. .................................. 385/11; 385/3; 385/2
[58] Field of Search .................................. 385/1–11, 14, 385/27–29, 39, 40, 122, 129, 130

[56] References Cited

U.S. PATENT DOCUMENTS

| 4,932,737 | 6/1990 | Yoon et al. | 385/3 |
| 5,265,185 | 11/1993 | Ashley | 385/132 |
| 5,555,326 | 9/1996 | Hwang et al. | 385/2 |

OTHER PUBLICATIONS

Hempelmann, U., Integrated Optical Proton Exchanged TM–Pass Polarizers in $LiNbO_3$:Modelling and Experimental Performance, Journal of Lightwave Technology, vol. 13, No. 8, Aug., 1995, pp. 1750–1759.

Suchoski, P.G., et al. Low–loss high–extinction polarizers fabricated in $LiNbO_3$ by proton exchange, Optics Letters, vol. 13, No. 2, pp. 172–174, Feb., 1988.

Oh, M–C., et al. Poling–Induced Waveguide Polarizers in Electrooptic Polymers, IEEE Photonics Technology Letters, vol. 8, No. 3, Mar., 1996, pp. 375–377.

*Primary Examiner*—Phan T. H. Palmer
*Attorney, Agent, or Firm*—Cohen, Pontani, Lieberman & Pavane

[57] ABSTRACT

An optical waveguide polarizer having a transverse electric wave pass mode. The waveguide polarizer includes an upper cladding layer, a core layer, and a lower cladding layer arranged in a vertically stacked relationship. The core layer includes an electro-optic polymer. The waveguide polarizer has a plurality of electrodes disposed on the upper and lower cladding layers and along both sides of a longitudinal region in the core layer such that the plurality of electrodes form electric fields in a direction substantially perpendicular to the core layer and along both sides of the longitudinal region so that a transverse electric wave mode is guided through the longitudinal region and a transverse magnetic wave mode is substantially extinguished in the longitudinal region.

6 Claims, 1 Drawing Sheet

TE-PASS OPTICAL WAVEGUIDE POLARIZER USING ELECRO-OPTIC POLYMERS

BACKGROUND OF THE INVENTION

1. Field of the Invention

The present invention relates to an integrated-optic waveguide device, and more particularly to a transverse electric wave (hereinafter, referred to as a TE) pass optical waveguide polarizer using an electro-optical polymer.

2. Description of Prior Art

In general, optical waveguide polarizers have been developed using lithium niobate ($LiNbO_3$) (Uwe Hempelmann et al., Journal of Lightwave Technology, Vol. 13, No. 8, pp. 1750–1759, 1995; P. G. Suchoski et al., Optics Letters, Vol. 13, No. 2, pp. 172–174, 1988).

Also, recently, an optical waveguide polarizer has been developed using an electro-optical polymer capable of reducing its processes and costs (Min-cheol Oh et al., IEEE, Photonics Technology Letters, Vol. 8, No. 3, 1996).

By poling the electro-optical polymer in the horizontal direction, the optical waveguide polarizer increases the refractive index of a transverse electric (TE) wave, and decreases the refractive index of a transverse magnetic (TM) wave. This polymeric waveguide polarizer has the advantage of the simplification in manufacturing it, but the ratio of the polarization extinction of the polymeric waveguide polarizers, which is one of very important features in the polarizer, is less than that of other polarizers using lithium niobate ($LiNbO_3$), because the poling field direction of the polymeric waveguide polarizer is not formed in the uniform horizontal direction.

To process different optic signals, it is necessary to develop different waveguides.

SUMMARY OF THE INVENTION

An object of the present invention is to provide a TE-pass optical waveguide polarizer improving the ratio of the polarization extinction, by perpendicularly poling both sides of the optical waveguide.

In accordance with an aspect of the present invention, there is provided an optical waveguide polarizer in a transverse electric wave pass mode, using an electro-optical polymer, the optical waveguide polarizer comprising: a lower cladding layer formed on a substrate; a core layer formed on the lower cladding layer, forming an input/output optical waveguides; an upper cladding layer formed the core layer; and a plurality of electrodes formed on the lower and upper cladding layers, the electrodes forming poles in a perpendicular direction so that a transverse electric wave pass mode is formed.

In accordance with another aspect of the present invention, there is provided a poling-induced waveguide polarizer in a transverse electric wave pass mode, using an electro-optical polymer, the poling-induced optical waveguide polarizer comprising: a plurality of electrodes formed on a lower and upper surfaces of the electro-optical polymer, the electrodes forming poles in a perpendicular direction so that a transverse electric wave pass mode is formed.

BRIEF DESCRIPTION OF THE DRAWINGS

Other objects and aspects of the invention will become apparent from the following description of embodiments with reference to the accompanying drawings, in which.

DETAILED DESCRIPTION OF THE INVENTION

Hereinafter, a TE-pass optical waveguide polarizer according to the present invention will be described below referring to FIGS. 1 and 2.

Figure 1:
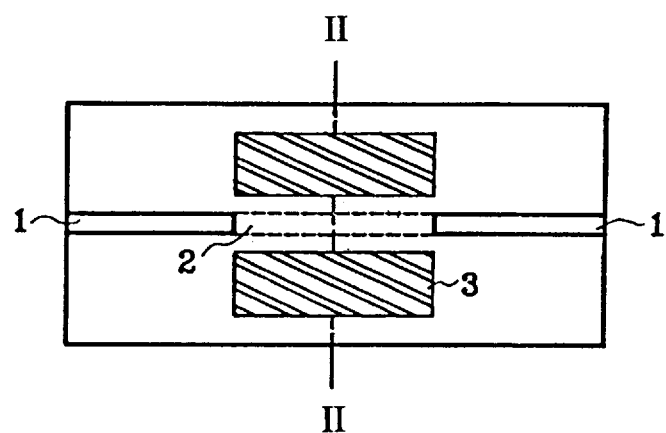
FIG. 1 is a schematic plane view illustrating a TE-pass optical waveguide polarizer using an electro-optical polymer in accordance with an embodiment of the present invention.
Figure 2:
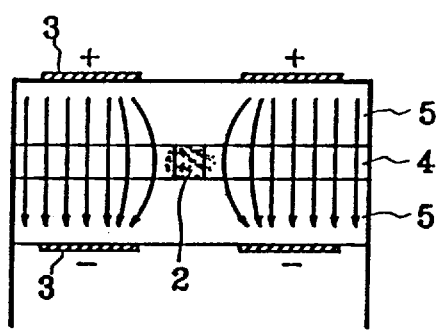
FIG. 2 is a cross-sectional view illustrating the TE-pass optical waveguide polarizer, taken along line A–A' in FIG. 1.

First, FIG. 1 is a schematic plane view illustrating a TE-pass optical waveguide polarizer using an electro-optical polymer in accordance with an embodiment of the present invention, and FIG. 2 is a cross-sectional view illustrating the TE-pass optical waveguide polarizer, taken along line A–A' in FIG. 1. In figure, the reference numerals 1, 2, 3, 4 and 5 denote an input/output optical waveguide, an optical waveguide formed by poling, a poling electrode, a core layer of the optical waveguide and a cladding layer of the optical waveguide, respectively.

As shown in FIG. 1, the TE-pass optical waveguide polarizer according to the present invention may be divided into three parts, an input optical waveguide, an output optical waveguide and a middle optical waveguide.

The input/output optical waveguide 1 is formed by using the reactive ion etching (RIE) or photobleaching process, and it transmits TE/TM polarization.

The waveguide 2 in the middle of the polarizer is formed by a poling process, but the waveguide 2 is not directly poled. The waveguide 2 is obtained by poling both sides thereof, using four electrodes 3, in order to provide birefringence. The refractive index at a portion in which the waveguide 2 is perpendicularly poled increases in the TM polarization and decreases in the TE polarization. Accordingly, the TE polarization is restricted to the middle of the waveguide 2, but the TM polarization is irradiated and extinguished through the cladding layer 5 on either side thereof. As a result, this device shown in FIG. 1 acts as a TE-pass optical waveguide polarizer.

The electro-optical polymer has birefringence by means of the poling process. Furthermore, if the polymer thin film is poled in a perpendicular direction, the refractive index of the TM polarization increases and the refractive index of the TE polarization decreases. Using these features stated above, if both sides of the waveguide are poled in a perpendicular direction, in case of TM polarization, the refractive index increases at both sides of the waveguide so that a guided ray is not formed. On the other hand, in case of TE polarization, the refractive index decreases on the outskirts of the waveguide so that a guided ray is formed passing through the waveguide.

Therefore, in case of the polarized light incident upon on the polarizer of the present invention, the TM polarization component radiates around and then is extinguished. Also, the TE polarization component is restricted to the middle of the waveguide. As a result, this device operates as a TE-pass optical waveguide polarizer.

As apparent from the stated above, the present invention has effects on the uniformity of a poling field by perpendicularly forming poling electrodes at both sides of the optical waveguide, and has the high polarization extinction ratio. Since the optical waveguide according to the present invention is not directly poled, an excess loss, which may be caused by the poling, are not created. Also, because the optical waveguide polarizer is made of the polymer, it is possible to reduce its processes and costs. Also, the waveguide according to the present invention can be integrated with different optical signal device, thereby forming a high performance device.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical waveguide polarizer having a transverse electric pass mode, the optical waveguide polarizer comprising:

a lower cladding layer;

a core layer formed of an electro-optic polymer and disposed on the lower cladding layer, the core layer having an input, an output and a longitudinal region extending between the input and the output;

an upper cladding layer formed on the core layer; and a plurality of electrodes formed on the lower and upper cladding layers and disposed along opposite sides of the longitudinal region of the core layer; and means for applying a voltage between electrodes on the upper cladding layer and electrodes on the lower cladding layer so as to form electric fields in a direction substantially perpendicular to the core layer so that a transverse electric wave mode is guided through the longitudinal region and a transverse magnetic wave mode is substantially extinguished in the longitudinal region.

2. An optical waveguide polarizer in accordance with claim 1, wherein the plurality of electrodes includes four electrodes, two electrodes on the upper cladding layer and two electrodes on the lower cladding layer.

3. A poling-induced waveguide polarizer having a transverse electric wave pass mode comprising:

an electro-optical polymer having a lower surface, an upper surface and a longitudinal region;

a plurality of electrodes formed on the lower and upper surfaces of the electro-optical polymer and along both sides of the longitudinal region; and means for applying a voltage between electrodes on the upper surface and electrodes on the lower surface so as to form electric fields in a direction substantially perpendicular to the electro-optical polymer so that a transverse electric wave mode is guided through the longitudinal region and a transverse magnetic wave mode is substantially extinguished in the longitudinal region.

4. A poling induced waveguide polarizer in accordance with claim 3, wherein the plurality of electrodes includes four electrodes, two electrodes on the upper surface and two electrodes on the lower surface.

5. An optical waveguide polarizer for passing a transverse electric wave mode, comprising:

a lower cladding layer;

a core layer formed of an electro-optic polymer and disposed on the lower cladding layer, the core layer having an input, an output and a longitudinal region extending between the input and the output;

an upper cladding layer formed on the core layer;

a first pair of electrodes disposed adjacent one side of the longitudinal region, one of the first pair of electrodes being formed on the lower cladding layer and the other of the first pair of electrodes being formed on the upper cladding layer, a voltage being applied between said first pair of electrodes so as to form a first electric field in a direction substantially perpendicular to the core layer;

a second pair of electrodes spaced from the first pair of electrodes so that the longitudinal region of the core layer is disposed between the first and second pairs of electrodes, one of the second pair of electrodes being formed on the lower cladding layer and the other of the second pair of electrodes being formed on the upper cladding layer, a voltage being applied between said second pair of electrodes so as to form a second electric field in a direction substantially perpendicular to the core layer, so that a transverse electric wave mode is guided through the longitudinal region and a transverse magnetic wave mode is substantially extinguished in the longitudinal region.

6. A method of poling a waveguide polarizer having a core layer formed of an electro-optic polymer and disposed between an upper cladding layer and a lower cladding layer, the core layer having an input, an output and a longitudinal region extending between the input and the output, and a plurality of electrodes formed on the lower and upper cladding layers and disposed on opposite sides of the longitudinal region of the core layer, the method comprising the step of:

applying a voltage between electrodes on the upper cladding layer and electrodes on the lower cladding layer so as to form electric fields in a direction substantially perpendicular to the core layer and along opposite sides of the longitudinal region so that a transverse electric wave mode is guided through the longitudinal region and a transverse magnetic wave mode is substantially extinguished in the longitudinal region.

* * * * *